(12) United States Patent
Duffey et al.

(10) Patent No.: US 8,827,674 B1
(45) Date of Patent: Sep. 9, 2014

(54) INJECTION MOLDING FACTORY SYSTEM AND MANUFACTURING METHOD

(75) Inventors: Thomas O. Duffey, Elm Grove, WI (US); Ryan Duffey, Milwaukee, WI (US)

(73) Assignee: Plastic Components, Inc., Germantown, WI (US)

( * ) Notice: Subject to any disclaimer, the term of this patent is extended or adjusted under 35 U.S.C. 154(b) by 306 days.

(21) Appl. No.: 13/405,635

(22) Filed: Feb. 27, 2012

(51) Int. Cl.
*B29C 45/00* (2006.01)

(52) U.S. Cl.
USPC .............................. 425/88; 425/457; 425/584

(58) Field of Classification Search
USPC ........................................... 425/88, 547, 584
See application file for complete search history.

(56) References Cited

U.S. PATENT DOCUMENTS

| | | | |
|---|---|---|---|
| 3,907,483 A * | 9/1975 | York | 425/436 R |
| 3,986,811 A * | 10/1976 | Gunnels, Jr. | 425/556 |
| 4,274,233 A | 6/1981 | Currier | |
| 4,608,008 A * | 8/1986 | Hehl | 425/542 |
| 4,719,059 A * | 1/1988 | Braun et al. | 264/40.1 |
| 5,061,169 A * | 10/1991 | Yamashiro et al. | 425/190 |
| 5,147,152 A * | 9/1992 | Link | 406/1 |
| 5,912,028 A * | 6/1999 | Airas et al. | 425/556 |
| 6,648,626 B1 * | 11/2003 | Eltvedt | 425/436 R |
| 6,748,704 B2 | 6/2004 | Eguchi et al. | |
| 7,725,857 B2 | 5/2010 | Foltz et al. | |
| 8,061,005 B2 | 11/2011 | Kipp et al. | |
| 2002/0026264 A1 * | 2/2002 | Choi | 700/197 |
| 2004/0044434 A1 * | 3/2004 | Morimura | 700/197 |
| 2005/0281907 A1 * | 12/2005 | Rinman et al. | 425/575 |

OTHER PUBLICATIONS

Goldsberry, "Getting started: Setting up an injection molding plant", May 5, 1999, Plastics Today, 4 pages.*

* cited by examiner

*Primary Examiner* — James Sanders
(74) *Attorney, Agent, or Firm* — Roger A. Gilcrest

(57) ABSTRACT

The present invention includes an injection molding factory system and an associated facility that comprises a building having a series of injection molding machines array on a first floor with the resin supply placed on a mezzanine level. The injection molding machines are arranged with automatic product conveyors to move injection molded product from the injection molding machines without the need for human operators or separate vehicles.

19 Claims, 15 Drawing Sheets

INJECTION MOLDING FACTORY SYSTEM AND MANUFACTURING METHOD

FIELD OF THE INVENTION

The present invention relates to injection molding machines, their operation, and plant layouts therefor.

BACKGROUND OF THE INVENTION

Injection molding machines are expensive to purchase, require expensive factory space and substantial quantities of electrical power.

The operation on an injection molding plant typically involves the use of an array of injection molding machines (often of varying capabilities) that are very expensive, precision equipment that typically require technicians and/or operators directly involved in their operation. Normally, operators will use hand trucks, forklifts and hoists to supply the machines with resin, to change mold sets and to remove molded product from the machines for further processing, testing, packaging and shipping.

Typical injection molding plant floor set-ups provide an array of machines that define required and relatively wide thoroughfares for persons and heavy lifting and transport machinery. Injection molding plants normally require a great detail of space to permit the storage, movement and injection of resin, as well as to permit the installation and replacement of mold sets, and the removal and packaging of the finished product for shipment. The continuous movement of persons, heavy machinery and mold sets, resin bins and product containers around expensive injection molding machines results in the constant risk to workers and the machines themselves.

In addition, injection molding plants typically also require active lighting to facilitate the movement of operators, equipment, resin and finished product.

Accordingly, it would be advantageous to have an injection molding system and method of operation that is substantially more cost effective to manufacture and operate.

Additionally, it is desirable for such a system and method to be less dependent upon operator input and to be capable of being operated/carried out in the absence of active lighting and/or that can be remotely monitored based upon operational parameters.

SUMMARY OF THE INVENTION

The present invention includes an injection molding factory system and an associated facility that comprises a building having a series of injection molding machines array on a first floor with the resin supply placed on a mezzanine level. The injection molding machines are arranged with automatic product conveyors to move injection molded product from the injection molding machines without the need for human operators or separate vehicles.

Injection Molding Machine Array with Narrow Inter-Machine Space

In a most fundamental aspect, the invention includes an array of injection molding machines having a product container conveyor associated with each injection molding machine and disposed between adjacent injection molding machines such that the product container conveyor is the sole means for accepting injection molded products from its associated injection molding machine into product containers. In the preferred embodiment, the invention includes a secondary conveyor that functions as the sole means for initially removing the product container from the immediate vicinity of the injection molding machines (i.e., for further processing, packaging and/or conveyance). In the preferred embodiment, the secondary conveyor is a gravity roller conveyor disposed above the product container conveyor, and a mechanism adapted to raise the product containers from the product container conveyor to the gravity roller conveyor, upon signal from the control system based upon processing parameters, such as part count or weight. In this regard, the microprocessor may have programming instructions adapted to signal the mechanism to move each of the product containers, once supplied, from the product container conveyor to the gravity roller conveyor. To spare space, the gravity roller conveyor is disposed over the product container conveyor and wherein their respective courses are in opposite directions.

Injection Molding Machine Array with Narrow Inter-Machine Space and Overhead Resin and Coolant Supply The present invention includes an injection molding factory system comprising a building having: (a) a first-level floor supporting a plurality of injection molding machines, each adapted to accept a supply of resin and each comprising a mold set adapted to be cooled by a liquid coolant; and (b) a mezzanine level platform above the injection molding machines, the mezzanine level platform supporting (1) a resin supply, the resin supply comprising resin conduits adapted to supply resin to each of the injection molding machines; (2) a supply of liquid coolant, the coolant supply comprising liquid conduits adapted to supply liquid coolant to each of the mold sets; and (3) a dryer system adapted to dry the resin disposed in fluid contact with the resin supply conduits.

It will be appreciated that the present invention allows for the efficient nesting of injection molding machines so as to conserve factory floor space. In this case, it is preferred that the distance between the adjacent injection molding machines is such that only a conveyor resides between the adjacent injection molding machines such that there need only be enough space necessary to accommodate the automatic transport system and any required human operator action. In most applications, the distance between the adjacent injection molding machines is preferably less than that necessary to accommodate a fork lift or other transport device used for handling bulk resin; i.e., typically wherein the distance between the adjacent injection molding machines is less than about 12 feet. In other embodiments, the distance between the adjacent injection molding machines need only be that necessary to accommodate an automatic product transport system such as that described herein.

Accordingly, the system of the present invention may be characterized as one that does not require the use of floor-level wheeled transport for the supply of resin to, or the removal of molded product from, the vicinity of the injection molding machines. It also does not require the use of floor-level wheeled transport for the supply of mold sets to, or the removal of mold sets from, the vicinity of the injection molding machines.

It is preferred that the injection molding factory system additionally comprises a vacuum conduit system adapted to convey the resin from the resin supply to the injection molding machines, and preferably wherein the resin is delivered to the injection molding machines exclusively by the vacuum conduit system.

The injection molding machines typically eject injected molded articles through mechanisms and systems known and used in the art. In the preferred embodiment of the present invention, the system additionally comprises, adjacent to each injection molding machine, a product container conveyor adapted to convey containers so as to be supplied in sequence by the injection molded articles, and once supplied, to be moved away from the respective injection molding machine. Most preferably, the injected molded articles are conveyed from each respective injection molding machine exclusively by the respective product container conveyor.

It is also preferred that the building additionally comprises a product packaging area, and wherein the system additionally comprises a common conveyor adapted to move the containers from the product container conveyors to the packaging area.

In a further preferred embodiment the injection molding factory system additionally comprises, adjacent to each injection molding machine, a part transporter and a control system with a microprocessor having programming instructions adapted to signal the part transporter to supply each of the product containers in sequence, and once supplied, to be moved from the product container conveyor. The control programming instructions are adapted to signal the part transporter to supply each of the product containers in sequence, and once supplied, to be moved from the product container conveyor.

In a preferred embodiment of the product container conveyor, there is a secondary conveyor as described herein comprising a gravity roller conveyor disposed above the product container conveyor with a mechanism adapted to raise the product containers from the product container conveyor to the gravity roller conveyor, upon signal from the control system.

The injection molding factory system also preferably additionally comprises an overhead crane installed in the building and positioned so as to be able to install a mold set into each of the plurality of injection molding machines. This further simplifies the mold set repair or replacement process, and obviates the need for floor level transport and lift mechanisms whose operation increases the need for space, also increases complication in the operation of the system as well as the attendant risk to operators.

The injection molding factory system may also optionally incorporate a remote control system, such as that comprising a microprocessor system including computer programming instructions adapted to monitor or control the operation of the injection molding machines, the microprocessor system in telecommunication contact with a control panel remote from the building, such that the operation of the plurality of injection molding machines may be monitored or controlled from outside the building.

The injection molding factory system may also be so completely remotely operated that, by use of the remote control system, the injection molding factory system may be operated in the absence of human-operational illumination (i.e., at light levels below that required to facilitate human operation of the injection molding machines and associated resin and product transportation, testing and packaging and handling.

The system may also incorporate in the building a video camera system directed at the plurality of injection molding machines, the video camera in telecommunication contact with a video monitor remote from the building so as to allow the plurality of injection molding machines to be monitored remotely. This may be used in low-light or even no-light applications. The remote control system may also take advantage of motion detectors to monitor the movement of persons and materiel within the building or its constituent spaces.

In addition, the injection molding factory system may also include in each of the plurality of injection molding machines, a cavity pressure sensor system associated with the respective mold sets, adapted to monitor the performance of each respective injection molding machine. Each cavity pressure sensor system in telecommunication contact with a control panel remote from the building, such that the performance of the plurality of injection molding machines may be monitored or controlled from outside the building.

Injection Molding Machine Array with Narrow Inter-Machine Space and Overhead Resin and Coolant Supply, with Product Container Conveyor In a preferred embodiment of the present invention, the injection molding factory system comprises a building having: (a) a first-level floor supporting a plurality of injection molding machines, each adapted to accept a supply of resin and each comprising a mold set adapted to be cooled by a liquid coolant; and (b) a mezzanine level platform above the injection molding machines, the mezzanine level platform supporting (1) a resin supply, the resin supply comprising resin conduits adapted to supply resin to each of the injection molding machines; (2) a supply of liquid coolant, the coolant supply comprising liquid conduits adapted to supply liquid coolant to each of the mold sets; and (3) a dryer system disposed in fluid contact with the resin supply conduits, and adapted to dry the resin; wherein the injection molding machines eject injected molded articles, and adjacent to each injection molding machine, a product container conveyor adapted to convey containers so as to be supplied in sequence by the injection molded articles, and once supplied, to be moved away from the respective injection molding machine.

This embodiment of the present invention may likewise include the other aspects of the system as described above.

Method of Injection Molding Using Injection Molding Machine Array with Overhead Resin and Coolant Supply and Automatic Product Supply and Container Conveyance The present invention includes an injection molding method comprising: (a) providing a plurality of operating injection molding machines on a first level, each machine comprising a mold set adapted to accept a supply of resin and adapted to be cooled by a liquid coolant; and (b) supplying, from a level above the injection molding machines, the following: (1) a resin to each mold set; and (2) a liquid coolant to each mold set; so as to produce injection molded articles; and (c) automatically supplying product containers with the injection molded articles; and (d) automatically conveying the product containers from the injection molding machines.

The method may additionally comprise automatically supplying the product containers with a predetermined number of the injection molded articles, and upon the number being reached, advancing each product container to the common conveyor.

The method preferably includes periodically, from a level above the injection molding machines, replacing the mold sets.

In the preferred embodiment, the injection molding factory method additionally comprises providing a product packaging area, and wherein the method additionally comprises conveying the product containers from the injection molding machines to the packaging area.

The injection molding factory method may be carried out in the absence of human-operational illumination, and the operation of the plurality of injection molding machines may be monitored or controlled from outside the building. Such control may include monitoring or controlling of the automatic supply of the injection molded articles to the product containers from outside the building and/or monitoring or controlling of the automatic conveyance of the product containers from the injection molding machines, from outside the building. The operation of the plurality of injection molding machines may be visually monitored from outside the building through use of video cameras and the like.

Likewise, the method may include monitoring the cavity pressure of each of the plurality of injection molding machines from outside the building, and controlling the operation of the plurality of injection molding machines in response to a change in the cavity pressure.

The present invention allows for the relatively safe and efficient operation of an injection molding plant facility with little or no dependence upon human operators.

The foregoing and other objects, features, and advantages of this invention will become more readily apparent from the following detailed description of a preferred embodiment which proceeds with reference to the accompanying drawings, wherein the preferred embodiment of the invention is shown and described, simply by way of illustration of the best mode contemplated of carrying out the invention.

As will be realized, the invention is capable of other and different embodiments, and its several details are capable of modifications in various obvious respects, all without departing from the invention. Accordingly, the drawings and description are to be regarded as illustrative in nature, and not as restrictive. It will also be appreciated that the detailed description represents the preferred embodiment of the invention, and that individual steps of the process of the invention may be practiced independently so as to achieve similar results.

DETAILED DESCRIPTION OF THE PREFERRED EMBODIMENTS

In accordance with the foregoing summary, the following provides a detailed description of the preferred embodiment, which is presently considered to be the best mode thereof.

Figure 1:
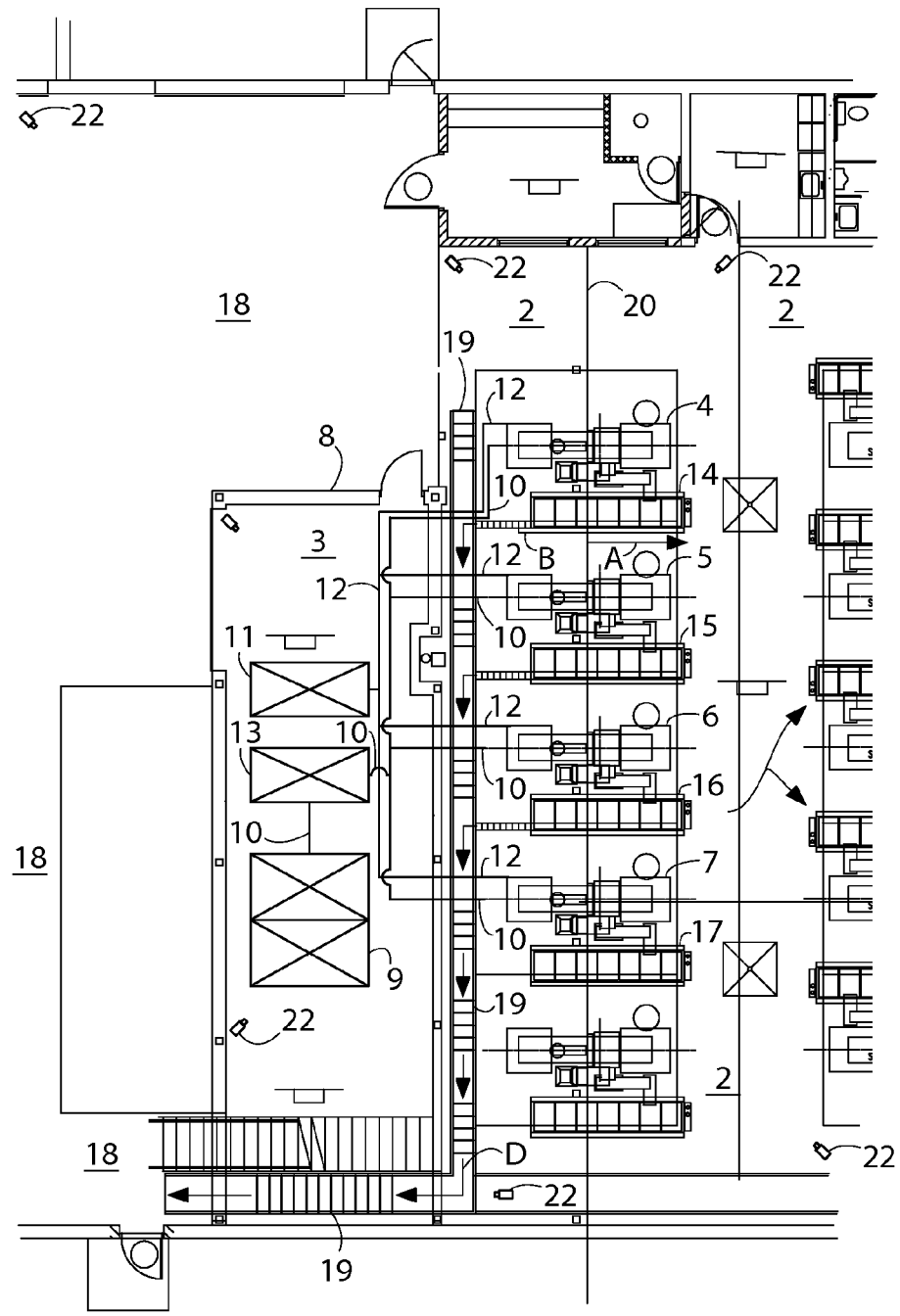
FIG. 1 is a schematic plan for an injection molding factory system in accordance with one embodiment of the present invention.

FIG. 1 is a schematic plan for an injection molding facility in accordance with one embodiment of the present invention.

FIG. 1 shows the factory layout for an injection molding facility 1, and shows first floor level 2 and a mezzanine level 3. The mezzanine level 3 is supplied in this embodiment by a free-standing metal platform 8 (or a mezzanine portion of the building that already exists or has been constructed for this purpose).

The present invention thus includes an injection molding factory system comprising a building 1 having a first-level floor 2 supporting a plurality of injection molding machines, such as the series of injection molding machines 4, 5, 6 and 7 in a linear array. Other arrays may be used depending upon the geometry presented by an existing building where the system of the present invention is to be located. Each injection molding machine is adapted to accept a supply of resin and each comprising a mold set adapted to be cooled by a liquid coolant; and a mezzanine level platform 8 above and preferably alongside the injection molding machines 4-7, the mezzanine level platform supporting (1) a resin supply 9, the resin supply comprising resin conduits 10 adapted to supply resin to each of the injection molding machines 4-7; (2) a supply of liquid coolant 11, the coolant supply comprising liquid conduits 12 adapted to supply liquid coolant to each of the mold sets in the injection molding machines 4-7; and (3) a dryer system 13 adapted to dry the resin disposed in fluid contact with the resin supply conduits 10. The system typically uses a vacuum conduit system to convey the resin from the resin supply to the injection molding machines, and normally exclusively by the vacuum conduit system.

It will be understood that the building housing the system may be of any dimensions necessary to accommodate the array of injection molding machines for the desired production, and the invention is not limited to the layout of the building beyond the use of the two-tiered arrangement described herein, or the length, course, number or geometrical arrangement (i.e., linear, circular, angled, etc.) of the conveyors that may be used.

The injection molding machines may be of any type as the particular application requires, such as those commercially available from Toyo, and each is adapted to accept a supply of resin and each comprising a mold set adapted to be cooled by a liquid coolant.

As reflected in FIG. 1, the distance between the adjacent injection molding machines is less than that necessary to accommodate a fork lift used for handling bulk resin, or other machines such as hand trucks and lifts that normally must approach the injection molding machines along the side in order to support and maintain their operation. Typically, this distance is less than 12 feet, most preferably less than 8 feet.

The injection molding machines normally are adapted to eject injected molded articles (or are supplied with material handling devices, such as robotic arms and the like for this purpose), and the system preferably additionally comprises, adjacent to each injection molding machine, a product container conveyor, such as product conveyors 14, 15, 16 and 17, adapted to convey containers so as to be supplied in sequence by the injection molded articles, and once supplied, to be moved away from the respective injection molding machine. Preferably, the injected molded articles are conveyed from each respective injection molding machine exclusively by the respective product container conveyor; and these most preferably operate automatically, most typically by having, adjacent to each injection molding machine, a part transporter and a microprocessor having programming instructions adapted to signal the part transporter to supply each of the product containers in sequence, and once supplied, to be moved from the respective product container conveyors 14-17.

In the preferred embodiment, the system also includes a gravity roller conveyor disposed above each product container conveyors 14-17, and a mechanism adapted to raise the product containers from the product container conveyor to the gravity roller conveyor.

The system may also incorporate control systems and logic controls, such as through the use of a microprocessor having programming instructions adapted to signal a mechanism to move each of the product containers, once supplied, from the product container conveyors 14-17 to its associated gravity roller conveyor. For instance, the gravity roller conveyor is disposed over the product container conveyor and wherein their respective courses are in opposite directions. This is shown in FIG. 1 with respect to injection molding machine 4. The product container conveyor 14 advances the product containers along direction A until provided with a prescribed number of molded articles at which point the product containers are raised and placed onto a gravity roller conveyor (disposed over the product container conveyor 14 and the product containers then roll in direction B onto common conveyor 19.

Additionally, a microprocessor system comprising computer programming instructions adapted to monitor or control the operation of the injection molding machines, may be placed in telecommunication contact with a control panel remote from the building, such that the operation of the plurality of injection molding machines may be monitored or controlled from outside the building.

In the preferred embodiment, the injection molding factory system additionally includes a product packaging area 18 disposed below mezzanine level 3, with a common conveyor 19 adapted to move the containers from the product container conveyors to the packaging area 18 for further processing, testing, packaging and/or transport.

The building may also be monitored using a video camera, such as video cameras 22, directed at the plurality of injection molding machines and/or conveyors, as well as elsewhere in the facility as desired, with the video camera(s) in telecommunication contact with a video monitor remote from the building so as to allow the plurality of injection molding machines to be monitored remotely.

Still another optional and preferred feature of the present invention is to provide each of the plurality of injection molding machines with a cavity pressure sensor system adapted to monitor the performance of each respective injection molding machine, each cavity pressure sensor system in telecommunication contact with a control panel remote from the building, such that the performance of the plurality of injection molding machines may be monitored or controlled from outside the building. Such mold sensor systems and associated controls are commercially available from RJG of Michigan.

The building may also be provided with an overhead crane 31 (see FIG. 5) installed in such a way as to be able to travel along course 20 and positioned so as to be able to install a mold set into each of the plurality of injection molding machines 4-7.

As will be appreciated from FIG. 1, additional arrays of injection molding machines, such as array 21, may be arranged on the first floor level 2, such as in additional linear arrays. These may be served by additional mezzanine levels placed to serve the further arrays in the same way as described with respect to the first array.

Figure 2:
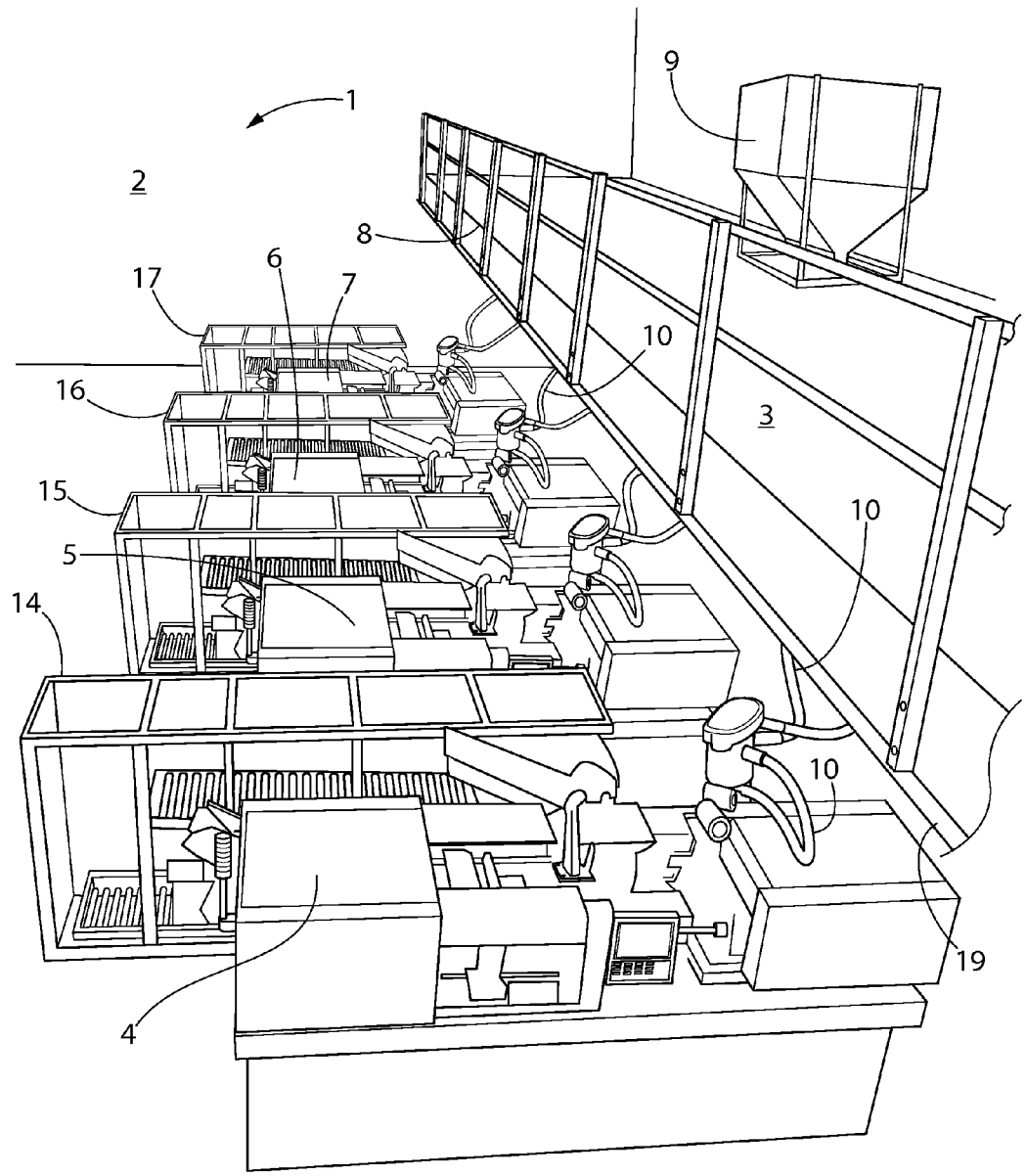
FIG. 2 is a perspective view of the factory layout for an injection molding factory system in accordance with one embodiment of the present invention.

FIG. 2 is a perspective view of the factory layout for an injection molding facility 1, and shows first floor level 2 and a mezzanine level 3. The mezzanine level 3 is supplied in this embodiment by a free-standing metal platform 8 (or a mezzanine portion of the building that already exists or has been constructed for this purpose).

FIG. 2 shows an injection molding factory system comprising a building 1 having a first-level floor 2 supporting the series of injection molding machines 4, 5, 6 and 7 in a linear array. Other arrays or series may be used to fill the balance of the available space, such as by repeating the construction shown in this view by providing additional machines and mezzanine set-ups to serve them.

FIG. 2 also shows how each injection molding machine is positioned so as to accept a supply of resin from a mezzanine level platform 8, and each comprising a mold set adapted to be cooled by a liquid coolant from a mezzanine level platform 8 positioned above—and in this case—alongside the injection molding machines 4-7. The mezzanine level platform 8 supports the resin supply 9, with resin conduits 10 adapted to supply resin to each of the injection molding machines 4-7.

Figure 3:
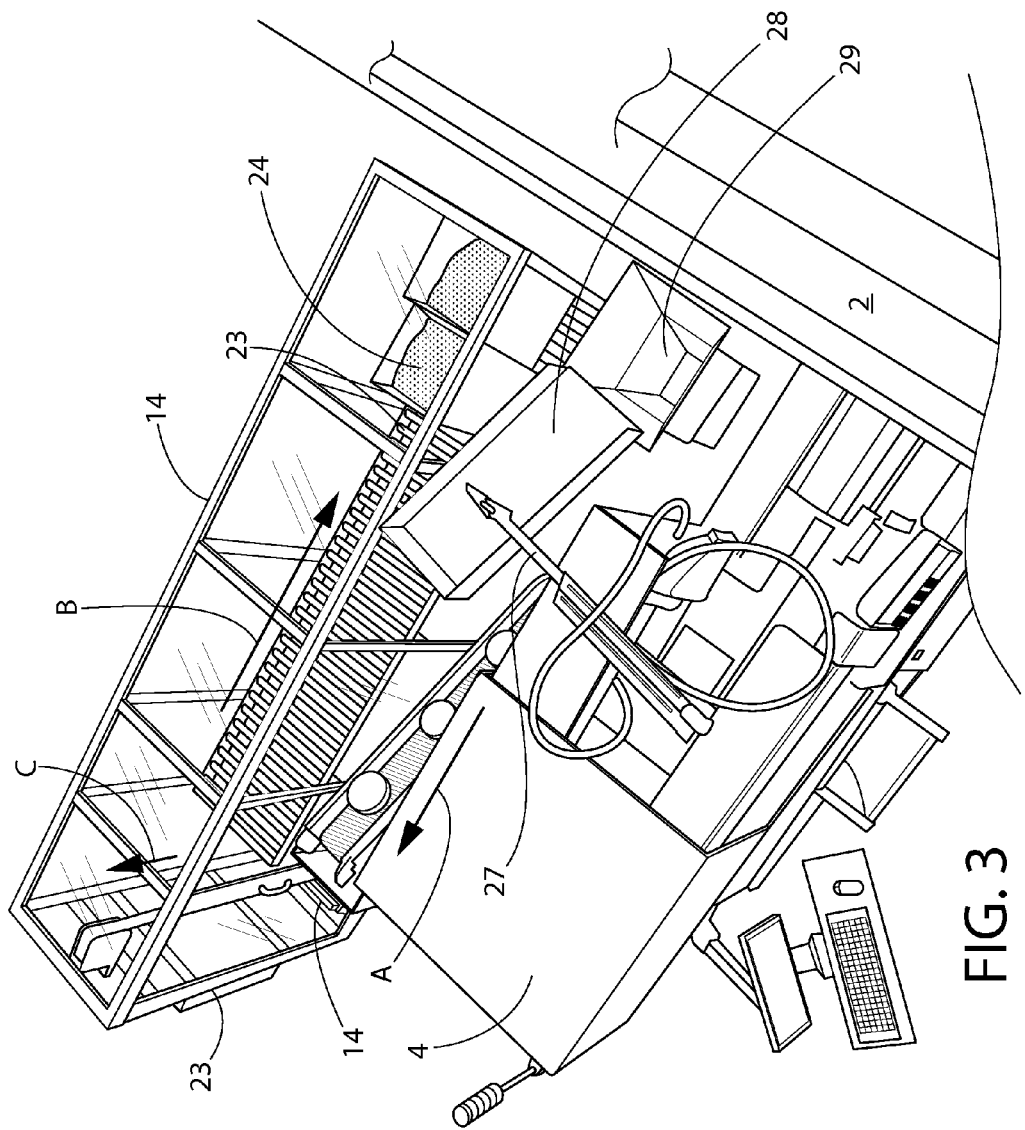
FIG. 3 is a upper perspective view of the factory layout for an injection molding facility in accordance with one embodiment of the present invention.

FIG. 3 is a upper perspective view of the factory layout for an injection molding facility, and shows one of the injection molding machines 4 and its associated product dispensing arm 27 and dispensing ramp 28 that are adapted to supply injection molded parts from the injection molding machine 4 to product containers, such as product container 29 as it is moved along conveyor 14 in direction A from, and from which it is raised in direction C by elevator mechanism 26 onto gravity roller conveyor 23 along which it proceeds along direction B toward the common conveyor 19. See FIG. 8.

It will be appreciated from this view that the product container conveyors 14 of the system may be replaced by any equivalent mechanism adapted to remove the injection molded product from the vicinity of the injection molding machines for further processing, packaging and/or shipment. The present invention thus allows for the operation of an array of injection molding machines in a relatively space-saving array or series to reduce the amount of floor space required, and while also eliminating the need for the provision of course ways to accommodate the use of transport machines such as forklifts, hand trucks, dollies and the like. This arrangement is therefore safer in that it reduces the areas where transport machines and human operators may travel, thus protecting the injection molding machines themselves from possible impact by transport machines, and reducing the need for human operators to operate around the injection molding machines, such as for the supply of resin, mold change-out and servicing. This arrangement and method also reduces the typical interaction between human operators and transport machines by eliminating much of their normal function (such as through the use of resin supply systems comprising resin hoppers and resin conduits, injection molded parts container conveyors and overhead crane systems).

Figure 4:
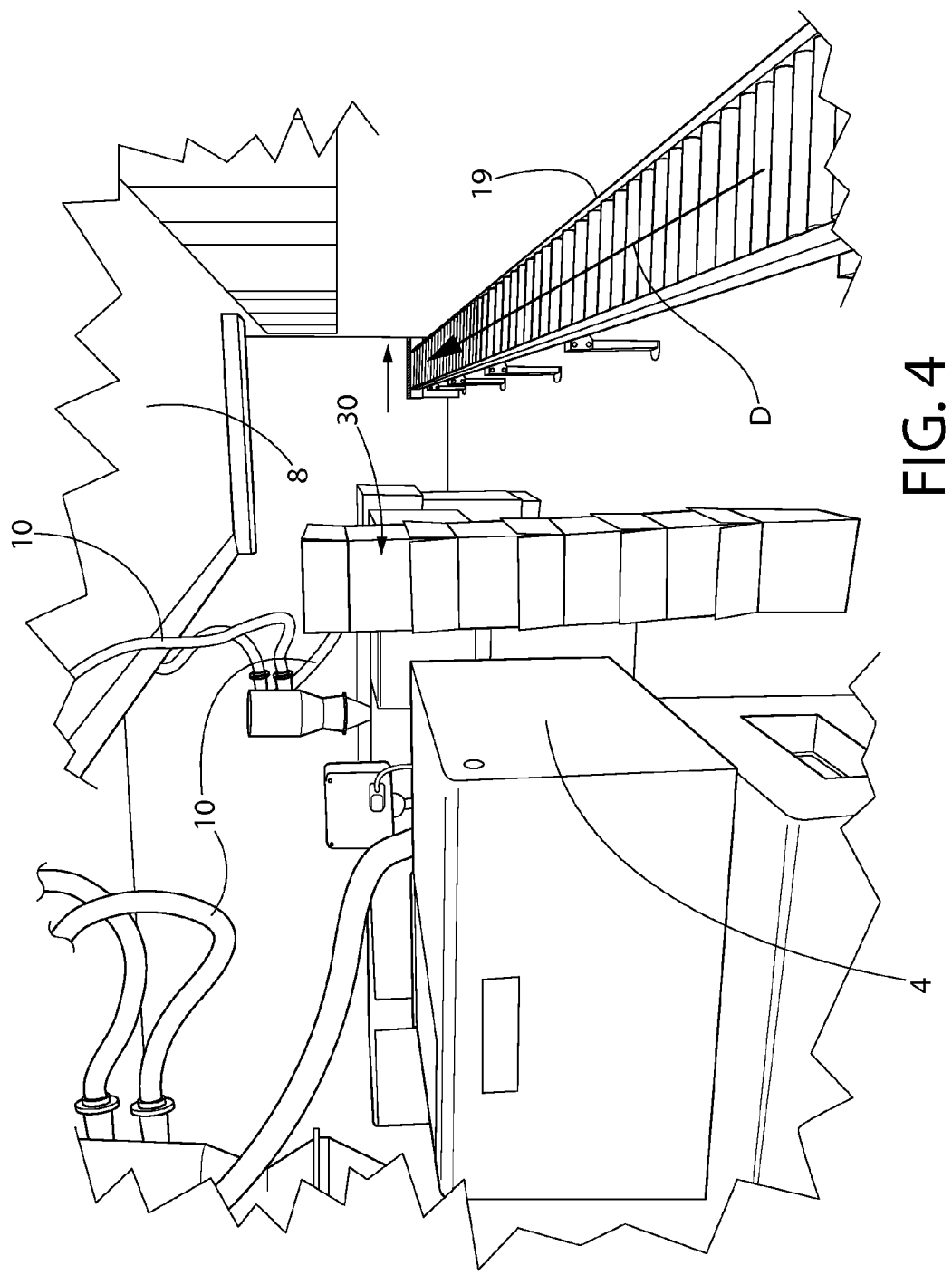
FIG. 4 is an elevation view of the factory layout for an injection molding facility, as would be seen from beneath the mezzanine level platform, in accordance with one embodiment of the present invention.

FIG. 4 is an elevation view of the factory layout for an injection molding facility, as would be seen from beneath the mezzanine level platform 8 and shows one of the injection molding machines 4 in the injection molding machine array being served from above by resin conduits 10. This view also shows a stack of product containers 30 that await loading onto product container conveyor 14 (not shown; see FIGS. 2 and 3). From this view, one can appreciate the position of common conveyor 19 that is arranged so as to be able to accept product containers from the gravity roller conveyor 23 (directly or indirectly), and the product containers then are further conveyed in direction D by common conveyor 19 for further processing, testing, packaging and/or transport, such as, in this embodiment, to the packaging area 18 as shown in FIG. 1.

Figure 5:
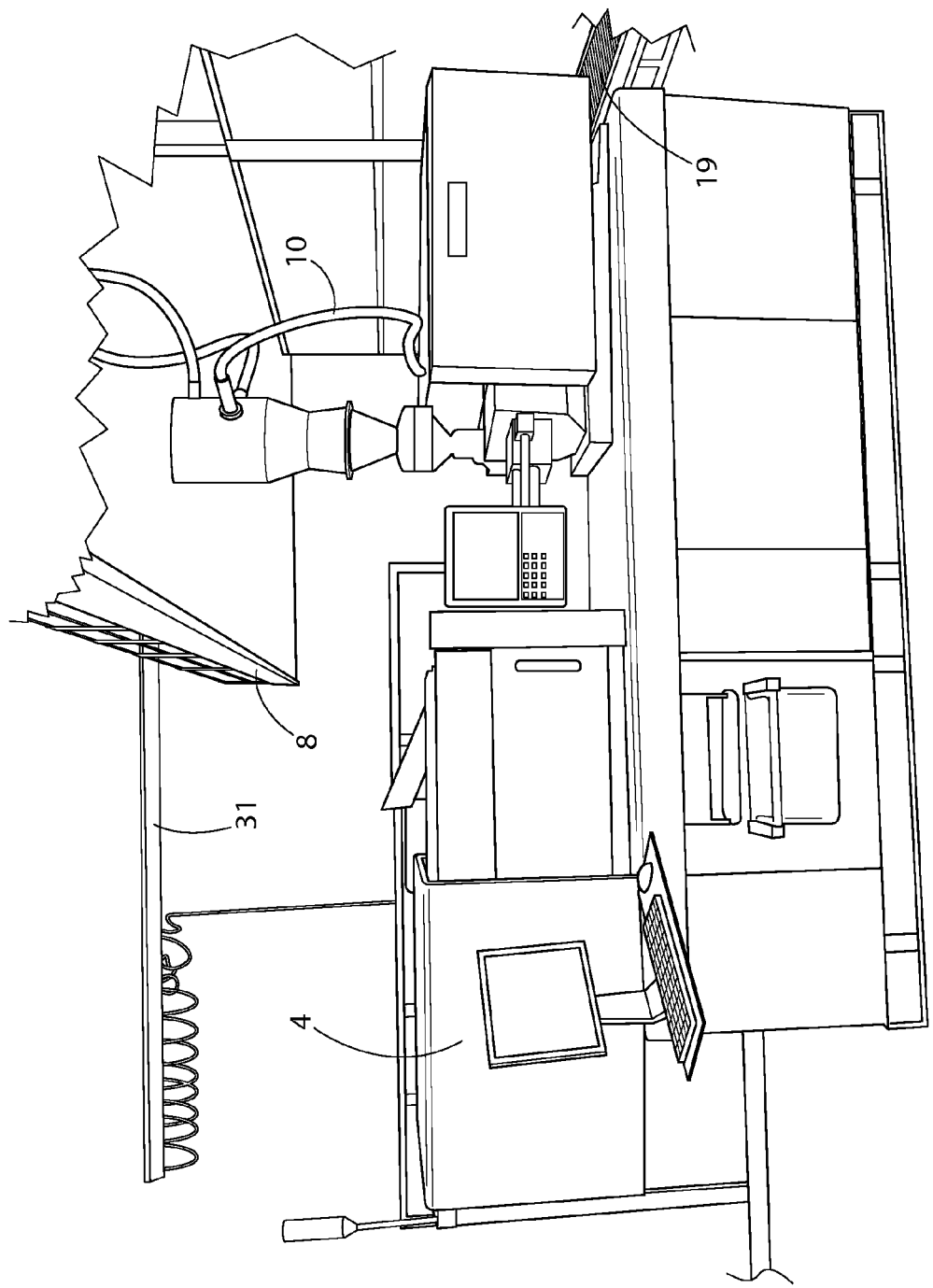
FIG. 5 is an elevation view of an injection molding factory system as would be seen at ground level from aside one of the series of injection molding machines in a linear array, in accordance with one embodiment of the present invention.

FIG. 5 shows an elevation view of an injection molding factory system as would be seen at ground level from one of the series of injection molding machines 4 in a linear array. From this view one can see the relative position of the overhead crane 31 installed in such a way as to be able to travel along course 20 (see FIG. 1) and positioned so as to be able to install a mold set into each of the plurality of injection molding machines 4-7. This view also shows the relative position of common conveyor 19, and the free-standing metal platform 8 that provides the mezzanine level 3 above first-floor level 2, as shown in FIG. 1.

Figure 6:
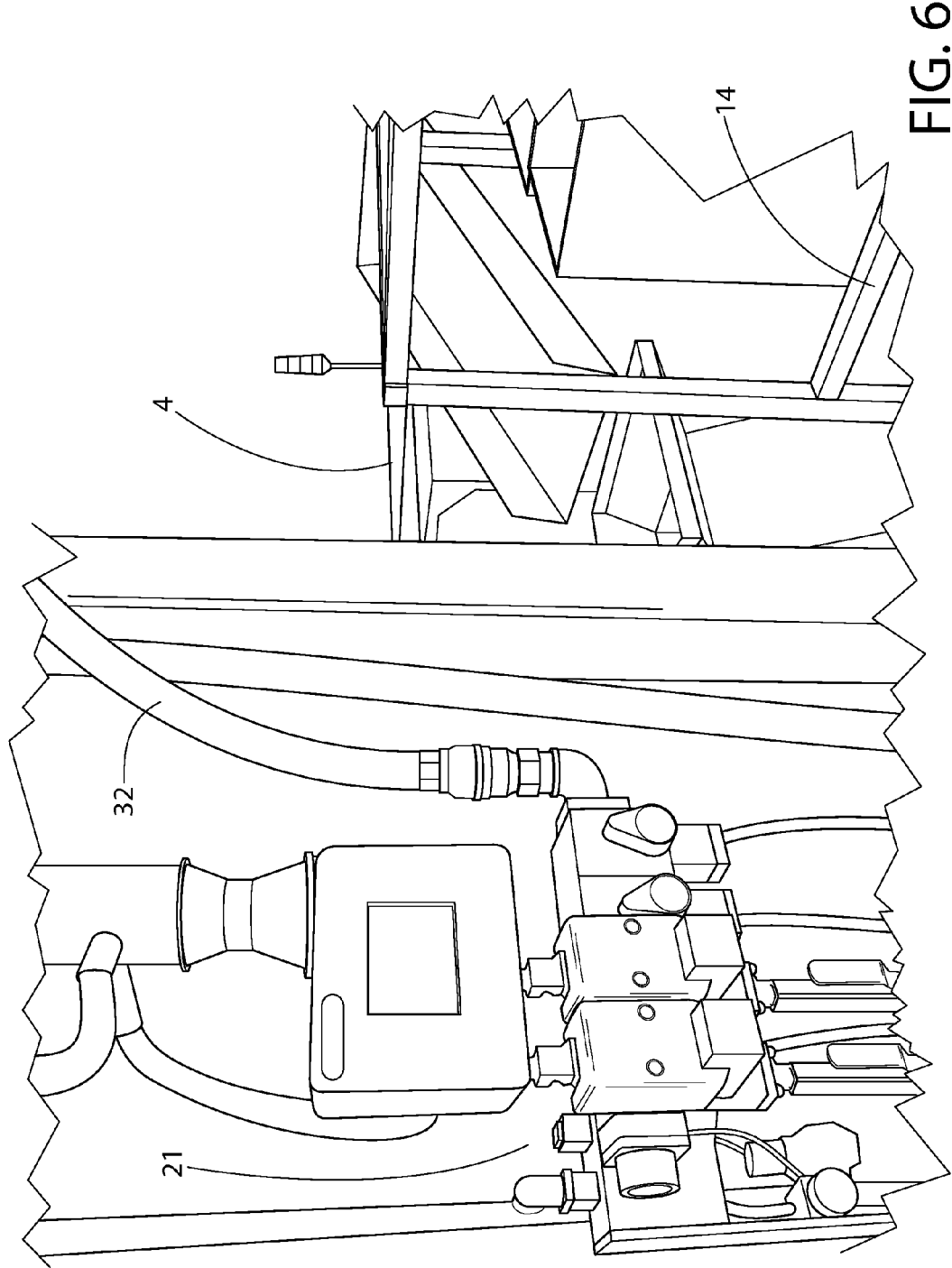
FIG. 6 is a detailed elevation view of an injection molding factory system as would be seen at ground level from aside one of the series of injection molding machines in a linear array, and taken from beneath the free-standing metal platform that provides the mezzanine level, in accordance with one embodiment of the present invention.

FIG. 6 shows a detailed elevation view of an injection molding factory system as would be seen at ground level from one of the series of injection molding machines 4 in a linear array, and taken from beneath the free-standing metal platform 8 that provides the mezzanine level 3. This view shows the relative position of one of the series of injection molding machines 4, the water conduits such as conduit 32 coming from free-standing metal platform 8 (the water optionally and preferably being supplied from above), and the valve system 21 of the injection molding machine 4 that pulses cooling water to the mold to create efficient cycle times.

Figure 7:
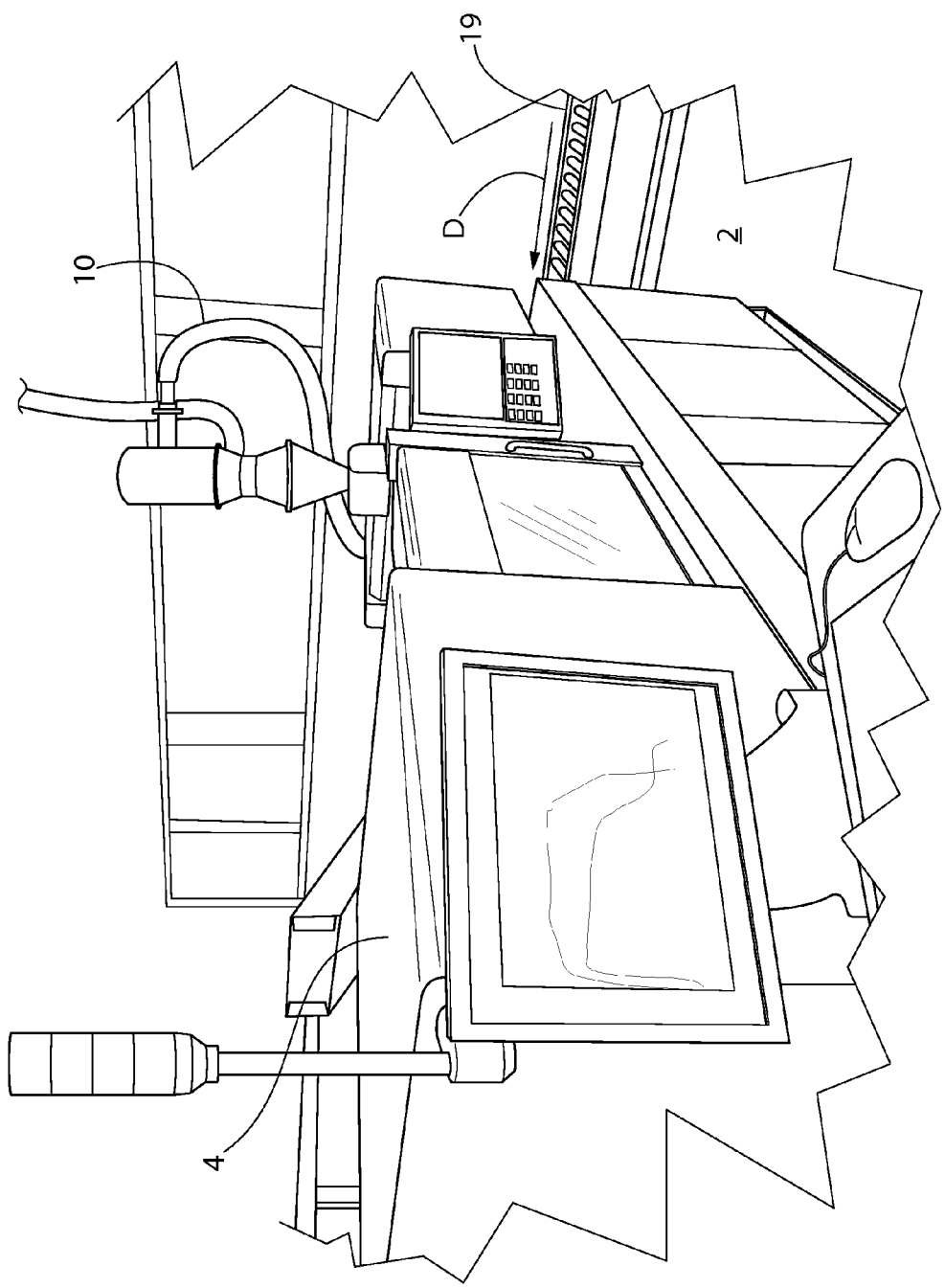
FIG. 7 is a detailed elevation view of an injection molding factory system as would be seen at ground level from aside one of the series of injection molding machines in a linear array, and taken from the first-floor level, in accordance with one embodiment of the present invention.

FIG. 7 shows a detailed elevation view of an injection molding factory system as would be seen at ground level from aside one of the series of injection molding machines 4 in a linear array, and taken from the first-floor level 2. This view shows the relative position of one of the series of injection molding machines 4 with its associated electronic controls. This view also shows the relative position of common conveyor 19 and its movement of filled product containers along direction D.

Figure 8:
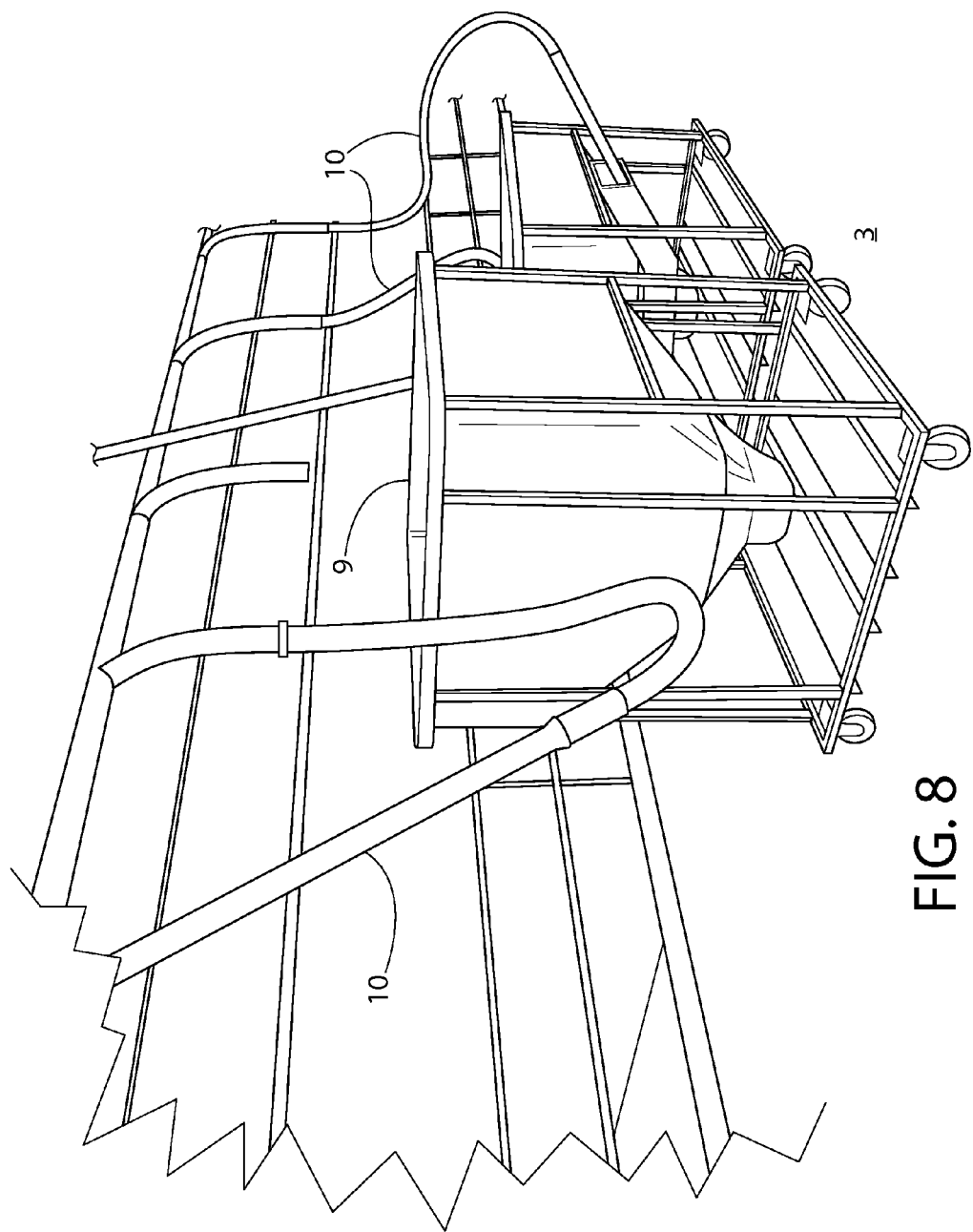
FIG. 8 is a perspective view of the resin hoppers of the resin supply supported on the mezzanine level of an injection molding factory system in accordance with one embodiment of the present invention.

FIG. 8 is a perspective view of the resin hoppers of the resin supply 9 supported on the mezzanine level 3. This view shows the resin conduits 10 that may conduct the resin either to the injection molding machines via the drying units, or directly to the injection molding machines below on the first floor level 2, depending upon whether the type of resin used requires drying.

Figure 9:
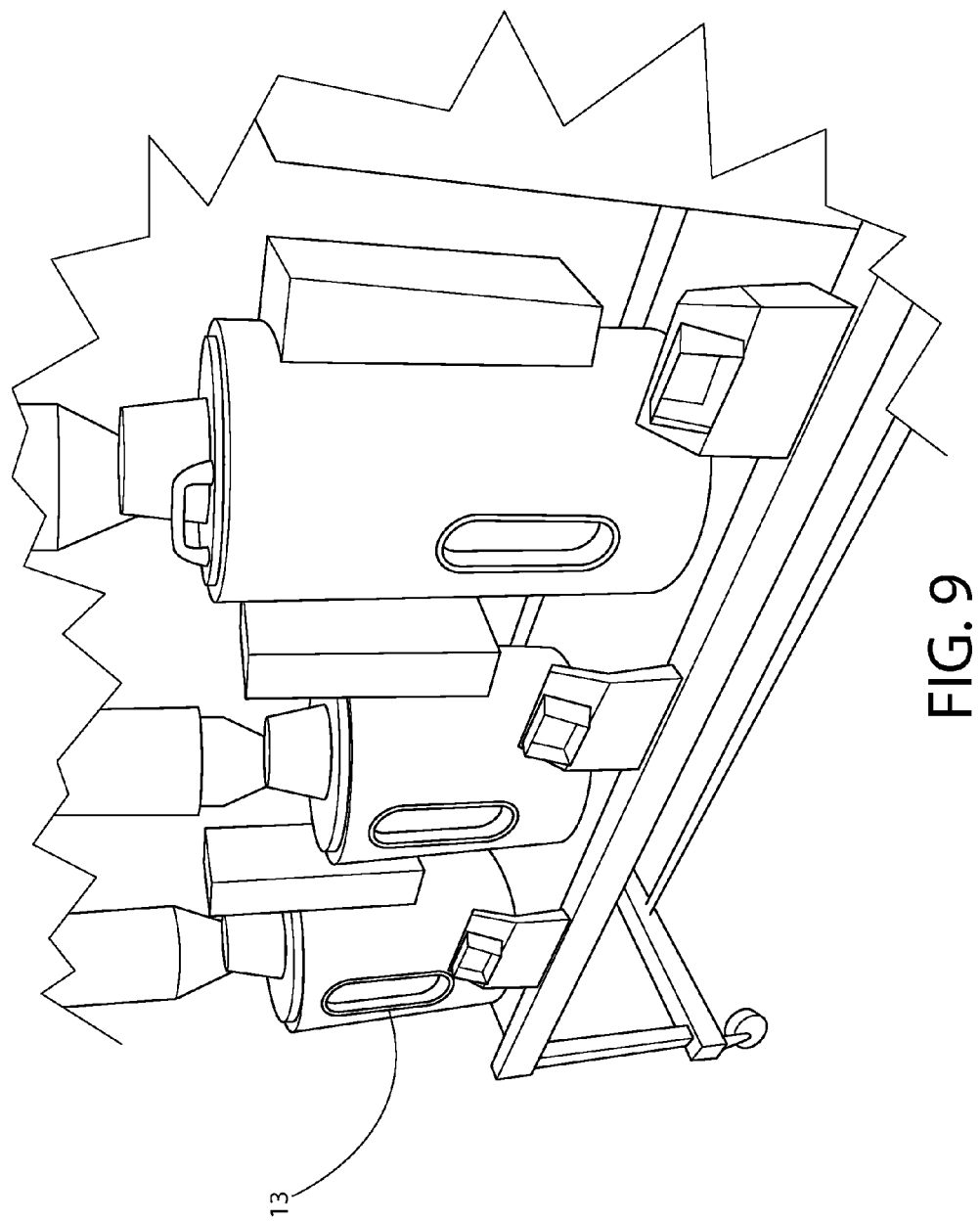
FIG. 9 is a perspective view of the dryer system supported on the mezzanine level of an injection molding factory system in accordance with one embodiment of the present invention.

FIG. 9 is a perspective view of the dryer system 13 comprising one or more dryers supported on the mezzanine level 3. This view shows the resin conduits 10 that may conduct the resin from the resin supply 9 to the drying units of the dryer system 13, and further from the dryer system 13 to the injection molding machines below on the first floor level 2, where the type of resin used requires drying.

Figure 10:
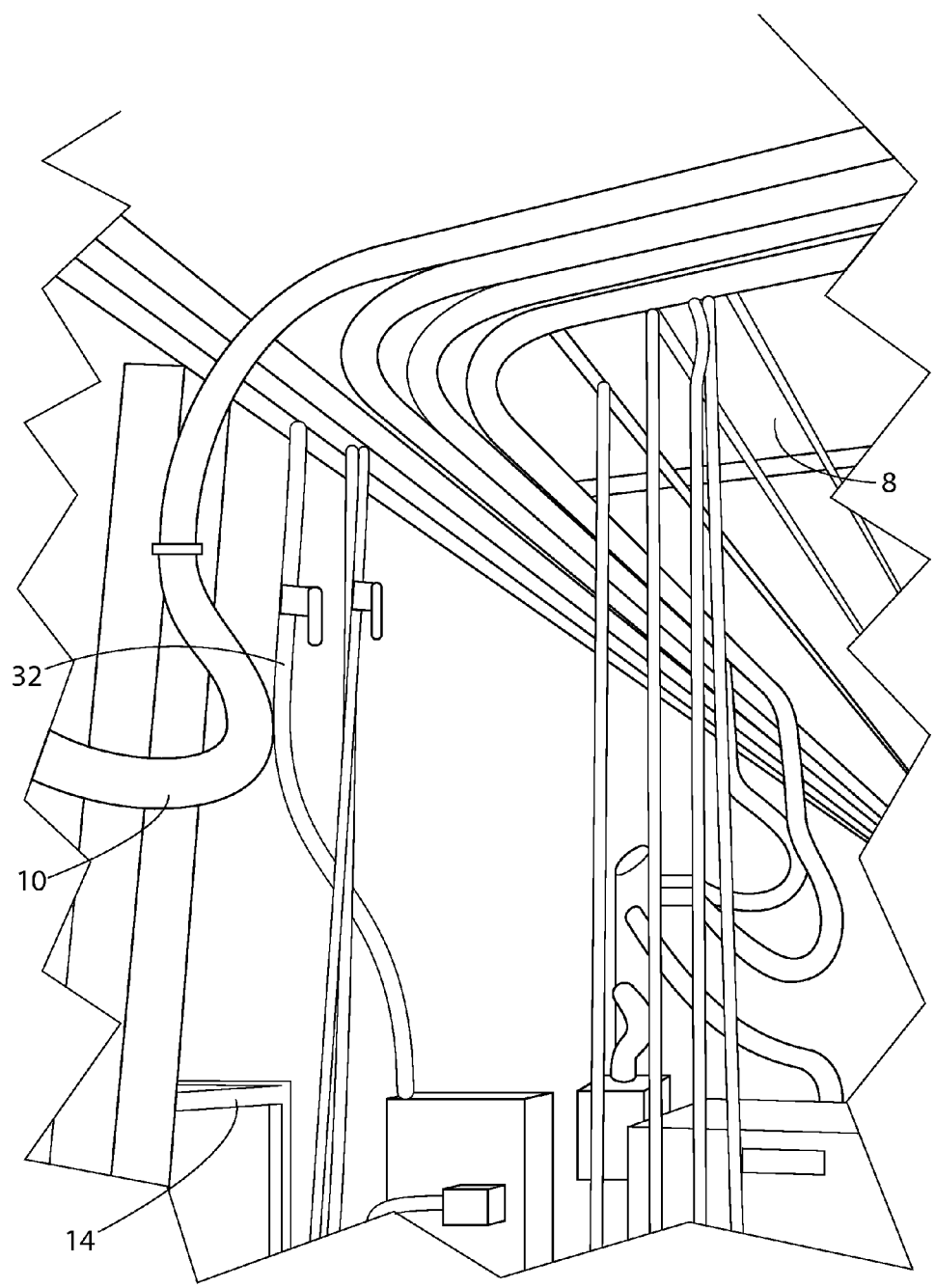
FIG. 10 is a lower perspective view of the mezzanine level taken from the first floor level of an injection molding factory system in accordance with one embodiment of the present invention.

FIG. 10 is a lower perspective view of the mezzanine level 3 taken from the first floor level 2. This view shows the resin conduits 10 that may conduct the resin from the resin supply 9 or the drying units of the dryer system 13, to the injection molding machines, such as injection molding machine 4 below on the first floor level 2.

Figure 11:
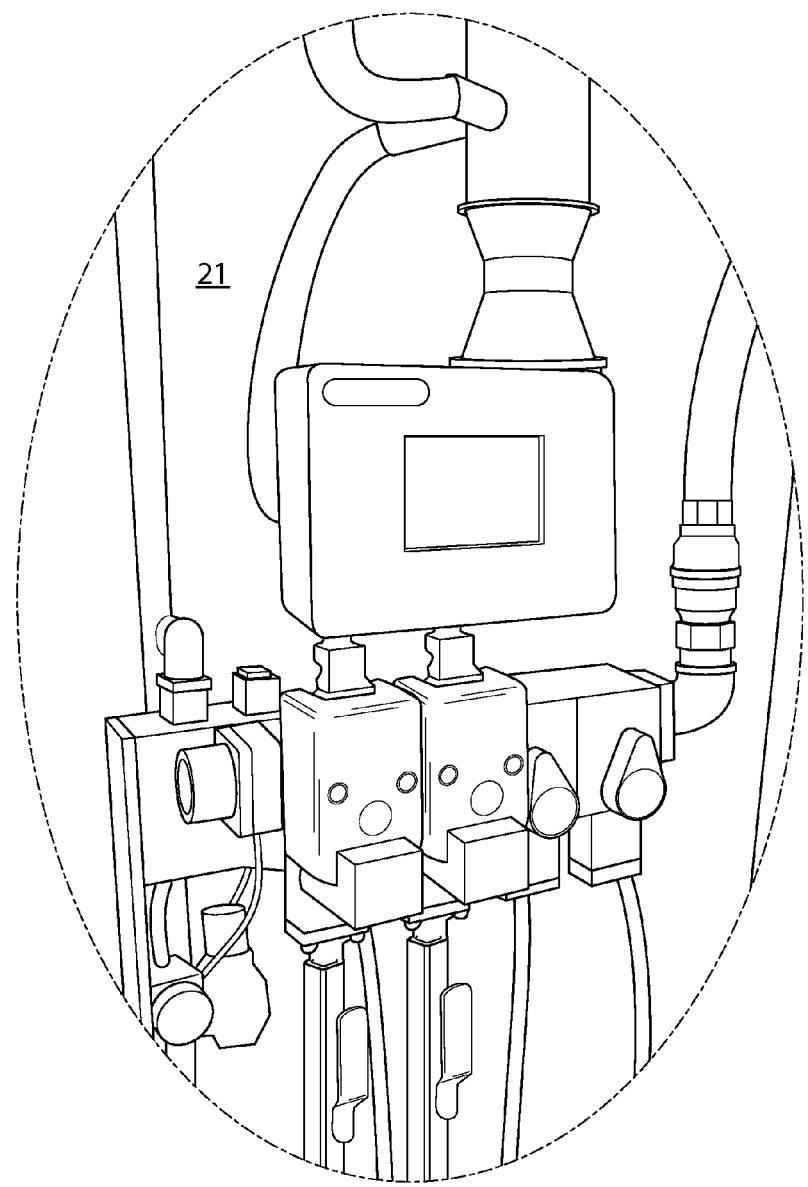
FIG. 11 is an elevation view of the valve system of the injection molding machines used in an injection molding factory system in accordance with one embodiment of the present invention.

FIG. 11 is an elevation view of the valve system 21 of the injection molding machine 4 that pulses cooling water to the mold to create efficient cycle times.

Figure 12:
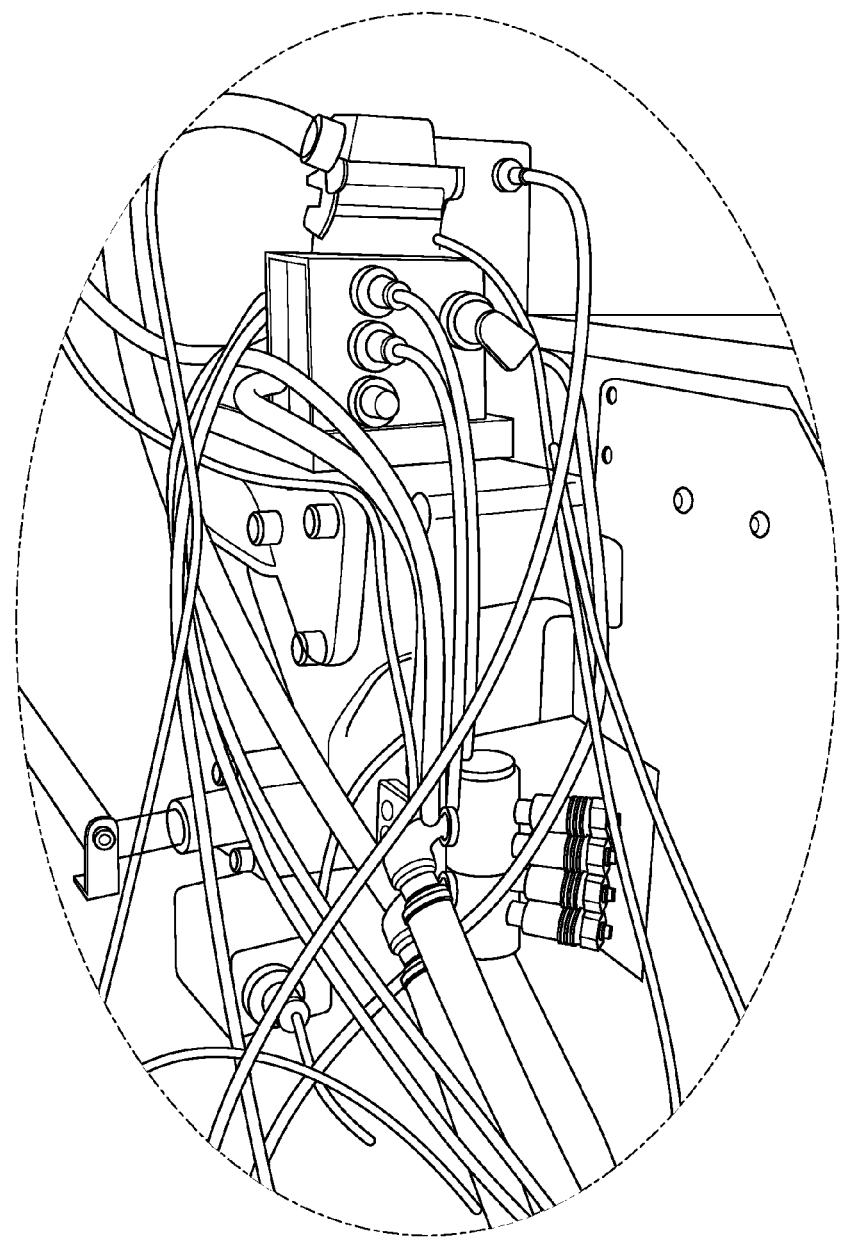
FIG. 12 is an elevation view of the water lines originating from the valve system of the injection molding machines used in an injection molding factory system in accordance with one embodiment of the present invention.

FIG. 12 is an elevation view of the water lines 22, originating from the valve system 21 that serve the mold body of the injection molding machine 4 with cooling.

Figure 13:
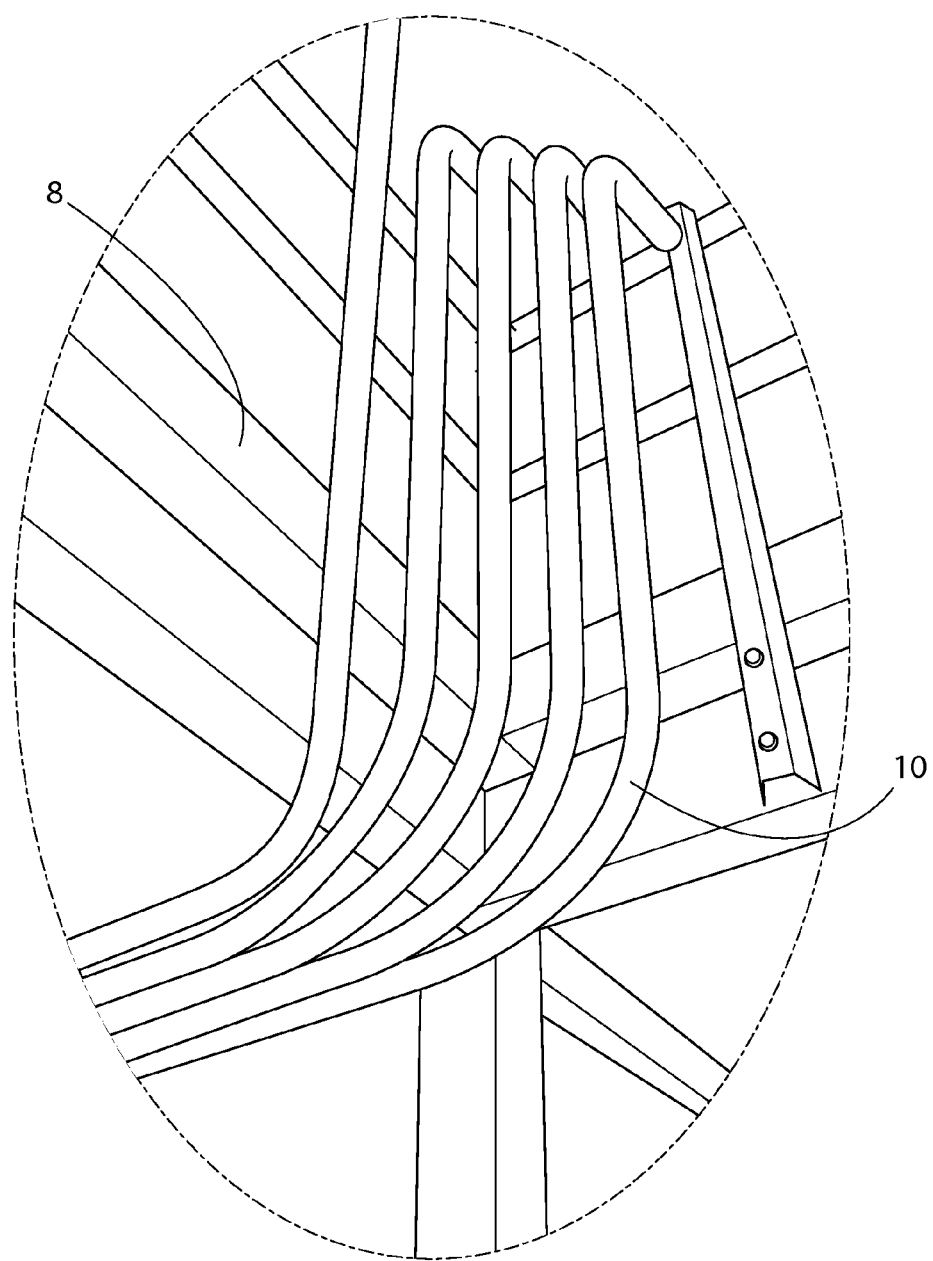
FIG. 13 is an additional lower perspective view of the mezzanine level taken from the first floor level of an injection molding factory system in accordance with one embodiment of the present invention.

FIG. 13 is an additional lower perspective view of the mezzanine level 3 taken from the first floor level 2. This view shows the resin conduits 10 that may conduct the resin from the resin supply 9 or the drying units of the dryer system 13, to the injection molding machines, such as injection molding machine 4 below on the first floor level 2.

Figure 14:
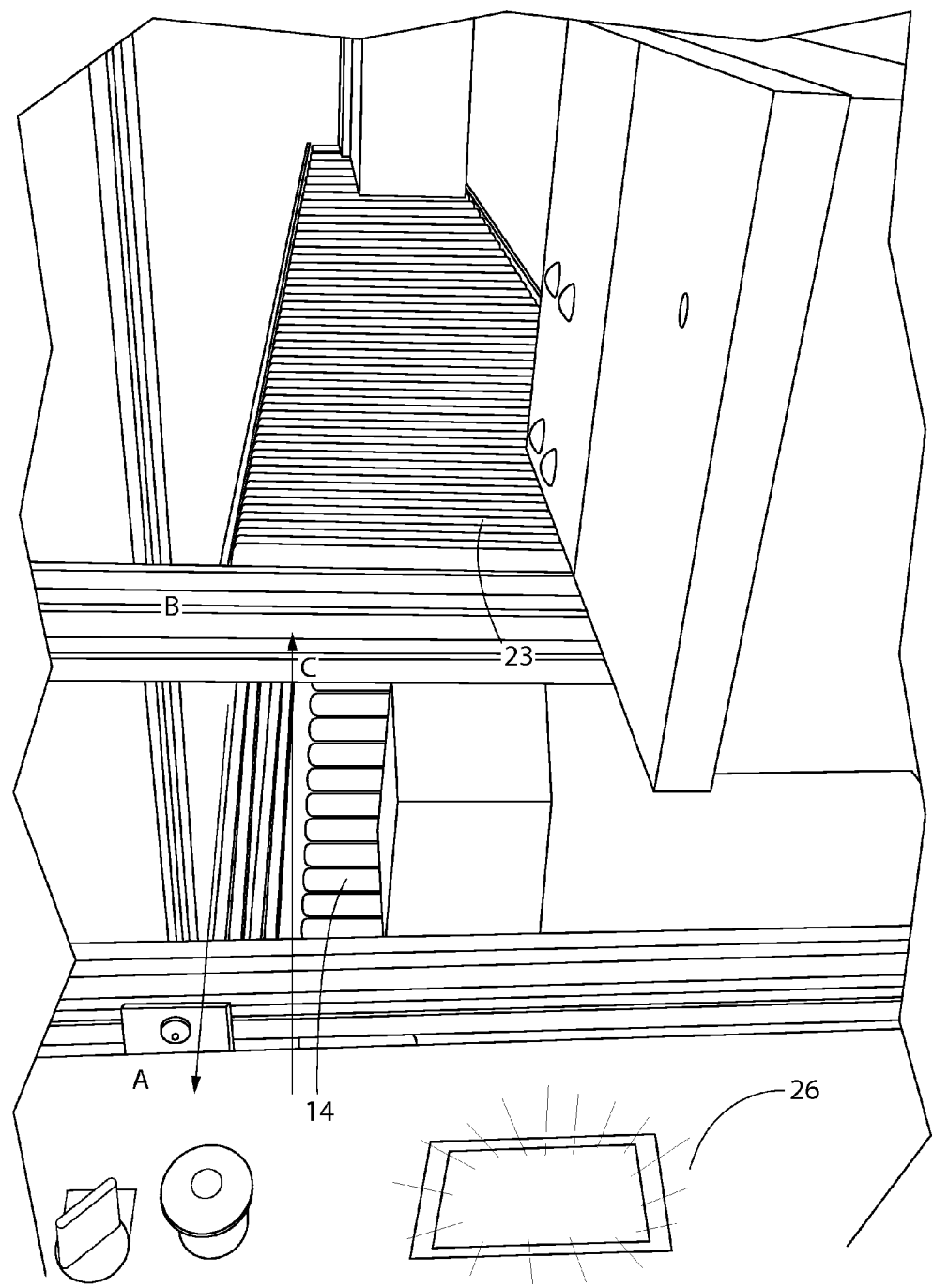
FIG. 14 is a detailed elevation view of one of the product container conveyors of an injection molding factory system in accordance with one embodiment of the present invention.

FIG. 14 is a detailed elevation view of one of the product container conveyors 14 of the system, as would be seen facing the common or trunk line conveyor 19 that is adapted to move the containers from the product container conveyors to the packaging area 18 for further processing, testing, packaging and/or transport. The product container conveyor 14, conveys the containers (such as container 22) so as to be supplied in sequence by the injection molded articles, and once supplied, to be moved away from the respective injection molding machine, along direction line A. Once the product container 22 advances to the end of the product container conveyor 14, the product containers are raised along direction line C by an elevator mechanism 26 that senses the presence of the product containers in sequence, and places and releases the product containers onto a gravity roller conveyor 23 (disposed over the product container conveyor 14), and the product containers (such as product container 24) then roll in direction B toward or onto common conveyor 19.

Figure 15:
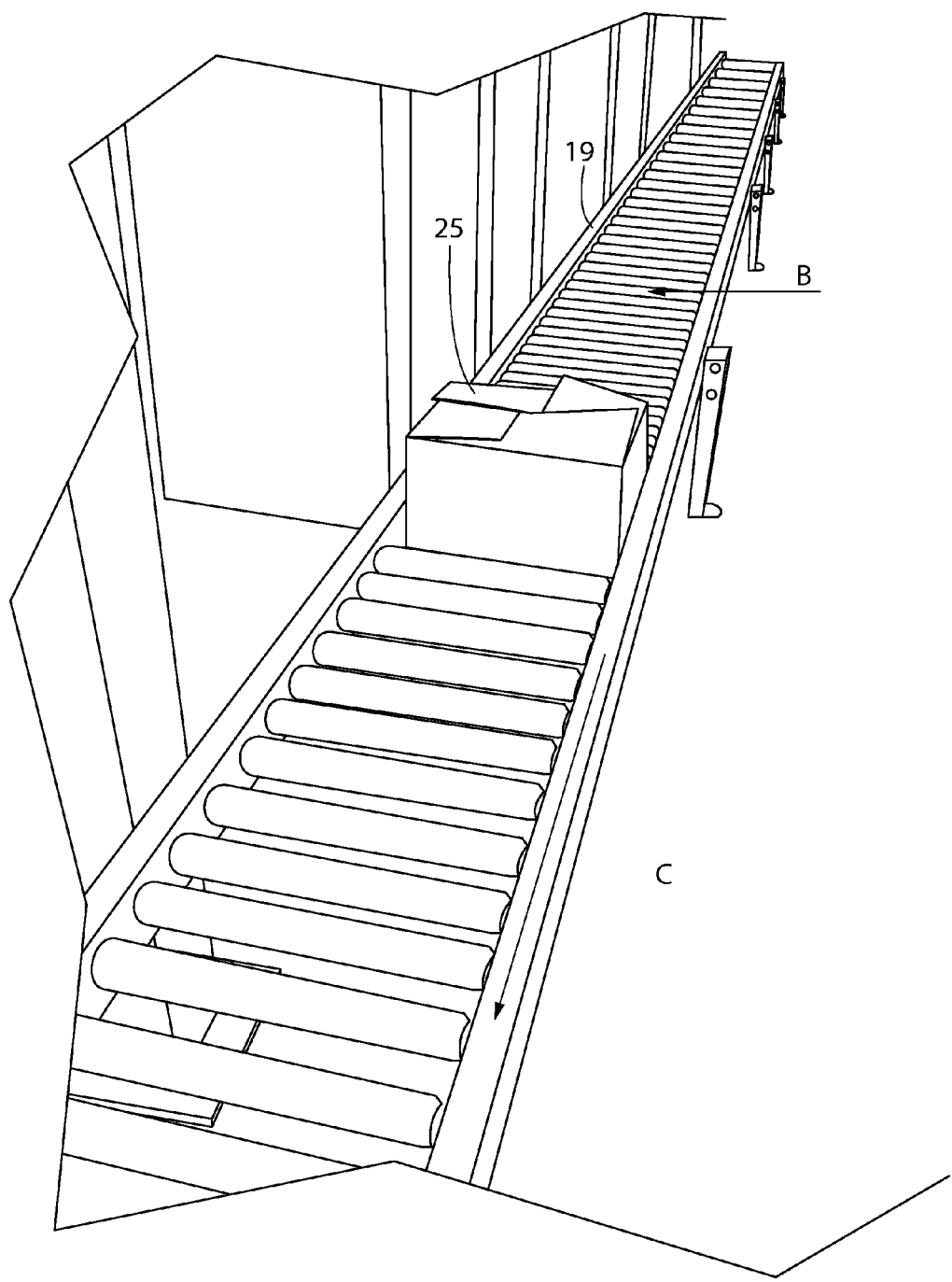
FIG. 15 is a detailed perspective view of common conveyor that is positioned to accept product containers in an injection molding factory system in accordance with one embodiment of the present invention.

FIG. 15 is a detailed perspective view of common conveyor 19 that is positioned to accept product containers (such as product container 25) that have been delivered to the common conveyor 19 along direction line B either by direct conveyance or operator action, and which then are further conveyed along direction C for further processing and/or packaging and transport.

Preferably, the injected molded articles are conveyed from each respective injection molding machine exclusively by the respective product container conveyor; and these most preferably operate automatically, most typically by having, adjacent to each injection molding machine, a part transporter and a microprocessor having programming instructions adapted to signal the part transporter to supply each of the product containers in sequence, and once supplied, to be moved from the respective product container conveyors 14-17.

In operation, the present invention also includes providing a plurality of operating injection molding machines on a first level such that each machine has a mold set that accepts a supply of resin and is cooled by a liquid coolant. The injection molding machines are supplied, from a higher level, with the resin and liquid coolant to each mold set, such that injection molded articles are produced. Product containers are then automatically supplied with the injection molded articles; and automatically conveyed from the injection molding machines, such as for packaging and transport.

The method preferably includes supplying product containers with a predetermined number of the injection molded articles, and upon the number being reached, advancing each product container to the common conveyor.

The plurality of operating injection molding machines comprises a product container conveyor adapted to convey containers to a common conveyor, and wherein the method additionally comprises automatically supplying the product containers with a predetermined number of the injection molded articles, and upon the number being reached, advancing each product container to the common conveyor.

The method also preferably includes periodically, from a level above the injection molding machines, replacing the mold sets. This may be done by any functional means, and preferably by an overhead crane that travels along course 20.

The preferred method includes providing a product packaging area, additionally comprises automatically conveying the product containers from the injection molding machines to the packaging area, such as by any functional automatic means, such as by common conveyor 19.

When desired, and using the conveyance and monitoring features of the present invention, the method of molding articles of the present invention may be carried out in the absence of human-operational illumination, such in low light or substantially no light conditions. The method may include using lighting only sufficient for visual monitoring of some portions of the system, such as the product container conveyor 14-17, the common conveyor 19, the resin supply 9, the coolant supply 11 and/or packaging area 18. Using the conveyance and monitoring features of the present invention, the system may be adapted for operation, and the method of the invention practiced, without, or substantially without the constant presence of the use of human operators. The system may be operated and the method of the invention practiced, with only periodic attention from human operators (such as for low frequency actions, such as machine maintenance, resin hopper reloading, product testing, packaging and/or transport). This may be necessary as little as hourly or at typical shift or partial shift intervals, such as little as every 4 or 8 hours.

The method additionally may include contemporaneous monitoring or controlling the operation of the plurality of injection molding machines from outside the building. This may include monitoring or controlling of the automatic supply of the injection molded articles to the product containers from outside the building, monitoring or controlling of the automatic conveyance of the product containers from the injection molding machines, from outside the building, visually monitoring the operation of the plurality of injection molding machines from outside the building, and/or monitoring the cavity pressure of each of the plurality of injection molding machines from outside the building, and controlling the operation of the plurality of injection molding machines in response to a change in the cavity pressure.

It will be appreciated that the logical order of the steps are used for purposes of illustration only, and that the measurements and determinations may be varied where not otherwise inconsistent with the purpose and result obtained in the practice of the invention.

The invention may be embodied in other specific forms without departing from the spirit or essential characteristics thereof. The foregoing embodiments are therefore to be considered in all respects illustrative rather than limiting on the invention described herein. The scope of the invention is thus indicated by the appended claims rather than by the foregoing description, and all changes that come within the meaning and range of equivalency of the claims are intended to be embraced therein.

What is claimed is:

1. An injection molding factory system comprising a building having:
   (a) a first-level floor supporting a plurality of injection molding machines, each adapted to accept a supply of resin and each comprising a mold set adapted to be cooled by a liquid coolant; and
   (b) a mezzanine level platform above said injection molding machines, said mezzanine level platform supporting (1) a resin supply, said resin supply comprising resin conduits adapted to supply resin to each of said injection molding machines; (2) a supply of liquid coolant, said coolant supply comprising liquid conduits adapted to supply liquid coolant to each of said mold sets; and (3) a dryer system adapted to dry said resin disposed in fluid contact with said resin supply conduits;
   wherein said injection molding machines eject injected molded articles, and wherein said system additionally comprises, adjacent to each said injection molding machine, a product container conveyor adapted to convey containers so as to be supplied in sequence by said injection molded articles, and once supplied, to be moved away from said respective injection molding machine; and
   additionally comprising, adjacent to each said injection molding machine, a part transporter and a microprocessor having programming instructions adapted to signal said part transporter to supply each of said product containers in sequence, and once supplied, to be moved from said product container conveyor;
   wherein said system additionally comprises a gravity roller conveyor disposed above said product container conveyor, and a mechanism adapted to raise said product containers from said product container conveyor to said gravity roller conveyor;
   wherein said microprocessor has programming instructions adapted to signal said mechanism to move each of said product containers, once supplied, from said product container conveyor to said gravity roller conveyor.

2. An injection molding factory system according to claim 1 wherein the distance between said adjacent injection molding machines is less than that necessary to accommodate a fork lift used for handling bulk resin.

3. An injection molding factory system according to claim 1 wherein the distance between said adjacent injection molding machines is less than 12 feet.

4. An injection molding factory system according to claim 1 additionally comprising a vacuum conduit system adapted to convey said resin from said resin supply to said injection molding machines.

5. An injection molding factory system according to claim 4 wherein said resin is delivered to said injection molding machines exclusively by said vacuum conduit system.

6. An injection molding factory system according to claim 1 wherein said injected molded articles are conveyed from each said respective injection molding machine exclusively by said respective product container conveyor.

7. An injection molding factory system according to claim 1 wherein said building additionally comprises a product packaging area, and wherein said system additionally comprises a common conveyor adapted to move said containers from said product container conveyors to said packaging area.

8. An injection molding factory system according to claim 1 wherein said gravity roller conveyor is disposed over said product container conveyor and wherein their respective courses are in opposite directions.

9. An injection molding factory system according to claim 1 additionally comprising an overhead crane installed in said building and positioned so as to be able to install a mold set into each of said plurality of injection molding machines.

10. An injection molding factory system according to claim 1 additionally comprising a microprocessor system comprising computer programming instructions adapted to monitor or control the operation of said injection molding machines, said microprocessor system in telecommunication contact with a control panel remote from said building, such that the operation of said plurality of injection molding machines may be monitored or controlled from outside said building.

11. An injection molding factory system according to claim 1 wherein said building additionally comprises a video camera directed at said plurality of injection molding machines, said video camera in telecommunication contact with a video monitor remote from said building so as to allow said plurality of injection molding machines to be monitored remotely.

12. An injection molding factory system according to claim 1 wherein each of said plurality of injection molding machines additionally comprises a cavity pressure sensor system adapted to monitor the performance of each respective injection molding machine, each said cavity pressure sensor system in telecommunication contact with a control panel remote from said building, such that the performance of said plurality of injection molding machines may be monitored or controlled from outside said building.

13. An injection molding factory system comprising a building having:
(a) a first-level floor supporting a plurality of injection molding machines, each adapted to accept a supply of resin and each comprising a mold set adapted to be cooled by a liquid coolant; and
(b) a mezzanine level platform above said injection molding machines, said mezzanine level platform supporting (1) a resin supply, said resin supply comprising resin conduits adapted to supply resin to each of said injection molding machines; (2) a supply of liquid coolant, said coolant supply comprising liquid conduits adapted to supply liquid coolant to each of said mold sets; and (3) a dryer system disposed in fluid contact with said resin supply conduits, and adapted to dry said resin;
wherein said injection molding machines eject injected molded articles, and
(c) adjacent to each said injection molding machine, a product container conveyor adapted to convey containers so as to be supplied in sequence by said injection molded articles, and once supplied, to be moved away from said respective injection molding machine; and
additionally comprising, adjacent to each said injection molding machine, a part transporter and a microprocessor having programming instructions adapted to signal said part transporter to supply each of said containers in sequence, and once supplied, to be moved from said product container conveyor;
wherein said system additionally comprises a gravity roller conveyor disposed above said product container conveyor, and a mechanism adapted to raise said product containers from said product container conveyor to said gravity roller conveyor, and wherein said microprocessor has programming instructions adapted to signal said mechanism to move each of said product containers, once supplied, from said product container conveyor to said gravity roller conveyor.

14. An injection molding factory system according to claim 13 wherein said building additionally comprises a product packaging area, and wherein said system additionally comprises a common conveyor adapted to move said containers from said product container conveyors to said packaging area.

15. An injection molding factory system according to claim 13 additionally comprising an overhead crane installed in said building and positioned so as to be able to install a mold set into each of said plurality of injection molding machines.

16. An injection molding factory system according to claim 13 wherein said system may be operated in the absence of human-operational illumination.

17. An injection molding factory system according to claim 13 additionally comprising a microprocessor system comprising computer programming instructions adapted to monitor or control the operation of said injection molding machines or said product container conveyors, said microprocessor system in telecommunication contact with a control panel remote from said building, such that the operation of said plurality of injection molding machines or said product container conveyors may be monitored or controlled from outside said building.

18. An injection molding factory system according to claim 13 wherein said building additionally comprises a video camera directed at said plurality of injection molding machines or said product container conveyors, said video camera in telecommunication contact with a video monitor remote from said building so as to allow said plurality of injection molding machines or said product container conveyors to be monitored remotely.

19. An injection molding factory system according to claim 13 wherein each of said plurality of injection molding machines additionally comprises a cavity pressure sensor system adapted to monitor the performance of each respective injection molding machine, each said cavity pressure sensor system in telecommunication contact with a control panel remote from said building, such that the performance of said plurality of injection molding machines may be monitored or controlled from outside said building.

* * * * *